United States Patent
Zenner et al.

(10) Patent No.: US 10,150,371 B2
(45) Date of Patent: Dec. 11, 2018

(54) REGENERATIVE BRAKING METHOD

(71) Applicant: FORD GLOBAL TECHNOLOGIES, LLC, Dearborn, MI (US)

(72) Inventors: Thomas Zenner, Dueren NRW (DE); Daniel Benjamin Kok, Ann Arbor, MI (US); Jimmy Kapadia, Ottawa Hills, OH (US)

(73) Assignee: Ford Global Technologies,LLC, Dearborn, MI (US)

( * ) Notice: Subject to any disclaimer, the term of this patent is extended or adjusted under 35 U.S.C. 154(b) by 181 days.

(21) Appl. No.: 15/342,395

(22) Filed: Nov. 3, 2016

(65) Prior Publication Data

US 2018/0118034 A1 May 3, 2018

(51) Int. Cl.
| | | |
|---|---|---|
| *B60T 8/17* | (2006.01) | |
| *B60L 7/12* | (2006.01) | |
| *B60L 7/26* | (2006.01) | |
| *B60T 7/22* | (2006.01) | |
| *B60T 1/10* | (2006.01) | |
| *F16D 61/00* | (2006.01) | |
| *B60L 7/18* | (2006.01) | |

(52) U.S. Cl.
CPC *B60L 7/26* (2013.01); *B60L 7/18* (2013.01); *B60T 1/10* (2013.01); *B60T 7/22* (2013.01); *B60T 8/17* (2013.01); *F16D 61/00* (2013.01); *B60L 2240/12* (2013.01); *B60T 2201/02* (2013.01); *B60T 2201/022* (2013.01); *B60T 2270/60* (2013.01); *B60T 2270/604* (2013.01)

(58) Field of Classification Search
None
See application file for complete search history.

(56) References Cited

U.S. PATENT DOCUMENTS

| | | | |
|---|---|---|---|
| 9,266,466 B2 | 2/2016 | Mizui et al. | |
| 9,381,897 B2 | 7/2016 | Schuler | |
| 9,694,806 B2 * | 7/2017 | Kishida | B60W 10/06 |
| 2015/0019058 A1 * | 1/2015 | Georgiev | B60L 7/18 |
| | | | 701/22 |
| 2015/0307099 A1 * | 10/2015 | Dextreit | B60W 50/085 |
| | | | 701/22 |
| 2016/0144721 A1 | 5/2016 | Soo et al. | |
| 2016/0257288 A1 * | 9/2016 | Miller | B60T 1/10 |

* cited by examiner

*Primary Examiner* — Thomas G Black
*Assistant Examiner* — Demetra R Smith-Stewart
(74) *Attorney, Agent, or Firm* — David Kelley; Brooks Kushman P.C.

(57) ABSTRACT

A vehicle system includes a controller that is programmed to, in response to a speed differential between the vehicle and a forward detected object, decelerate the vehicle at a first rate during a first period via regenerative braking alone and decelerate the vehicle at a second rate during a second period, following the first period, to reduce a distance to the forward detected object from an initial distance to a minimum distance.

20 Claims, 4 Drawing Sheets

REGENERATIVE BRAKING METHOD

TECHNICAL FIELD

The present disclosure relates to hybrid vehicles and methods of controlling regenerative braking.

BACKGROUND

Regenerative braking is a feature that may be employed by hybrid and/or electric vehicles to recapture the kinetic energy of the vehicle during a braking event. During regenerative braking, a generator may be operated to convert the kinetic energy of the vehicle into electrical energy. The electrical energy recaptured during regenerative braking may be used to operate various vehicle subsystems or to recharge a vehicle battery.

SUMMARY

A vehicle system includes a controller that is programmed to, in response to a speed differential between the vehicle and a forward detected object, decelerate the vehicle at a first rate during a first period via regenerative braking alone and decelerate the vehicle at a second rate during a second period, following the first period, to reduce a distance to the forward detected object from an initial distance to a minimum distance.

A regenerative braking method includes, in response to a speed differential between a vehicle and a forward detected object, decelerating the vehicle at a first rate during a first period via regenerative braking alone and decelerating the vehicle at a second rate during a second period, following the first period, to reduce a distance to the forward detected object from an initial distance to a minimum distance.

A vehicle includes a generator, friction brakes, and a controller. The controller is programmed to, in response to a forward detected object, decelerate the vehicle at a first rate during a first period via the generator at a maximum power output and decelerate the vehicle at a second rate during a second period, following the first period, via the friction brakes to obtain a minimum distance and a zero speed differential between the vehicle and the forward detected object.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
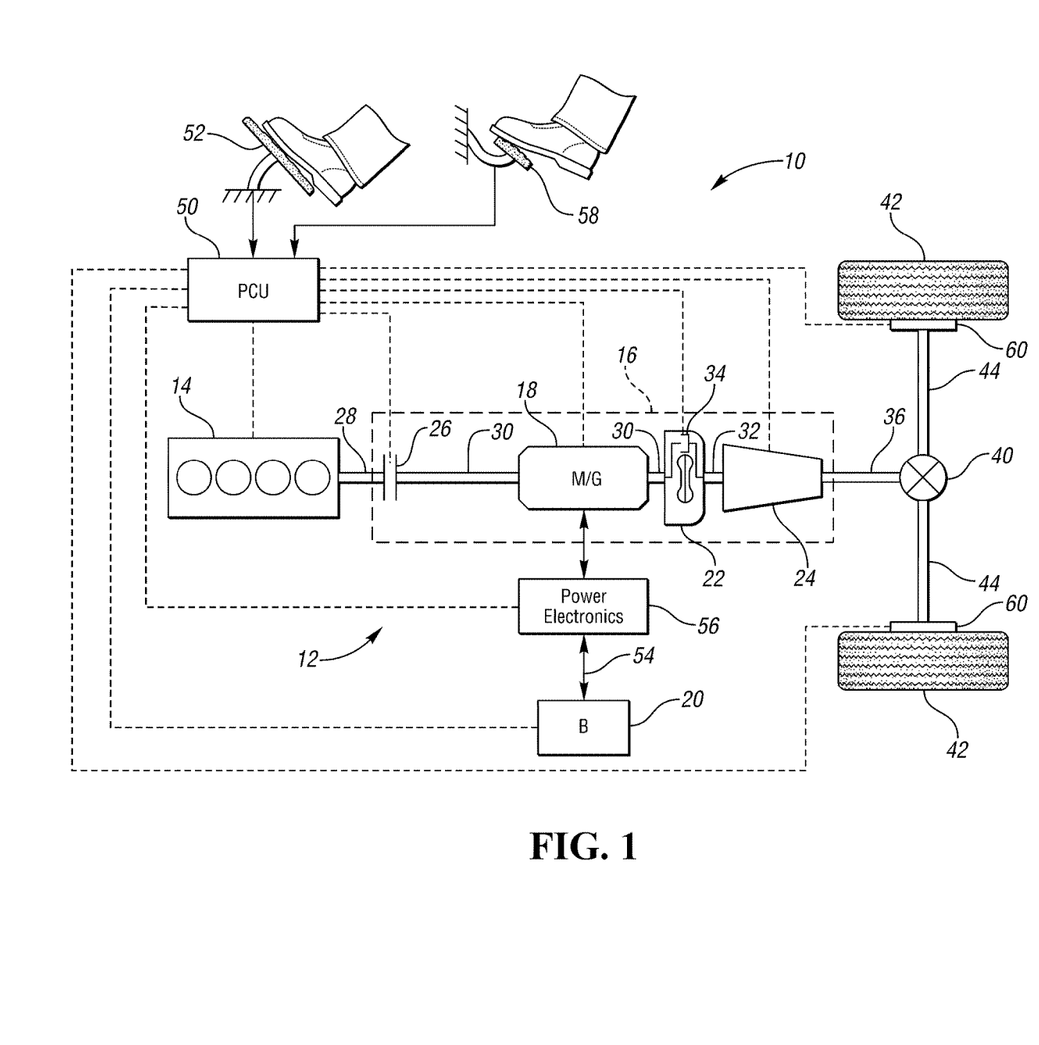
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
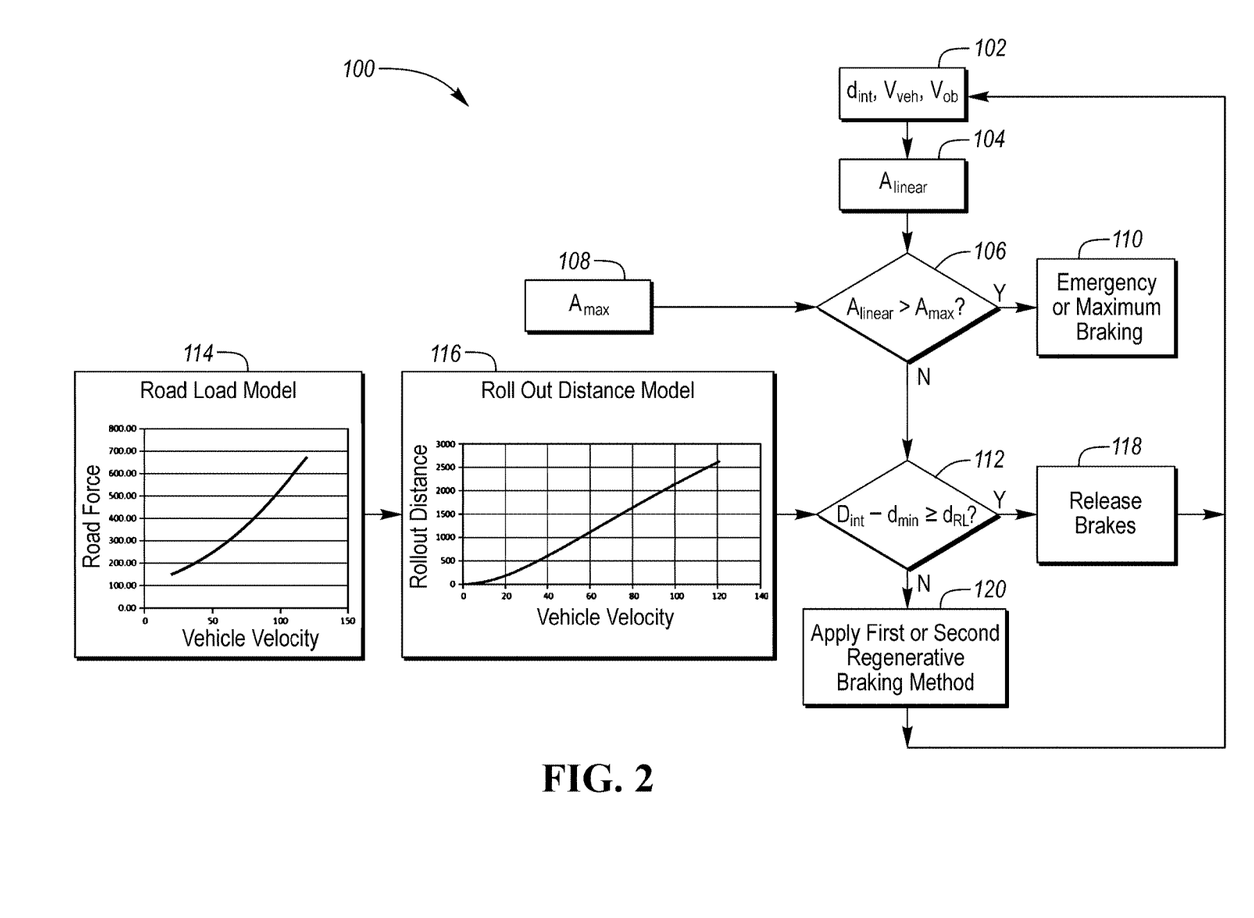
FIG. 2 is a flowchart illustrating a control algorithm for a regenerative braking method.

Referring to FIG. 2, a control algorithm for a regenerative braking method 100 is illustrated. The control algorithm may be stored in the memory of the controller 50. The method 100 may be implemented by an application of the brake pedal 58 or by releasing the accelerator pedal 52 (also known as a tip-out) without an application of the brake pedal 58. The controller 50 may implement the method 100 by controlling or actuating various components of the vehicle 10 based on various conditions of the vehicle 10. The method 100 begins at block 102 where a current distance, $d_{cur}$, from the vehicle 10 to a forward detected object, a speed or velocity, $V_{veh}$, of the vehicle 10, and a speed or velocity, $V_{ob}$, of the forward detected object are determined. A sensing system or device may be used to measure the current distance, $d_{cur}$, to the forward detected object. Sensing systems may include, but are not limited to, cameras, lidar systems, radar system, sonar systems, etc. A relative velocity between the vehicle 10 and the forward detected object may be determined by measuring the change in distance between the vehicle 10 and the forward detected object over a period of time. The difference between the current velocity of the vehicle 10 (which may be determined by speed sensors located on the vehicle 10) and the relative velocity will be equal to the velocity, $V_{ob}$, of the forward detected object. The control algorithm may be continuously and iteratively performed. By iteratively running through the control algorithm, the system will continuously control a regenerative (or recuperation) rate and/or brake control, which may include regenerative braking, friction braking, or a combination thereof. This may lead to two or more phases with significantly different deceleration rates, as shown in the examples in FIGS. 4 and 6 below.

The current distance, $d_{cur}$, from the vehicle 10 to the forward detected object, velocity, $V_{veh}$, of the vehicle 10, and velocity, $V_{ob}$, of the forward detected object, along with a minimum required distance, $d_{min}$, between the vehicle 10 and the forward detected object are input into block 104 to determine a linear acceleration rate, $a_{linear}$, that is required to reduce the relative velocity between the vehicle 10 and the forward detected object to zero upon obtaining the minimum required distance, $d_{min}$, between the vehicle 10 and the forward detected object. The linear acceleration rate, $a_{linear}$, may also be referred to as the baseline deceleration rate. The linear acceleration rate, $a_{linear}$, may be based on the following relationship (1):

$$a_{linear} = \frac{1}{2} \times \frac{(V_{veh} - V_{ob})^2}{d_{cur} - d_{min}} \quad (1)$$

The minimum required distance, $d_{min}$, between the vehicle 10 and the forward detected object may be any distance set to provide a safe distance between the vehicle 10 and the forward detected object. Alternatively, the minimum required distance, $d_{min}$, may be set by the operator of the vehicle 10. The minimum required distance, $d_{min}$, may range from approximately zero to a value approximately equal to the range of the sensing system used to measure the distance between the vehicle 10 and the forward detected object.

The linear acceleration rate, $a_{linear}$, is then input into decision block 106 along with a maximum acceleration rate, $a_{max}$, that is determined at block 108. The maximum acceleration rate, $a_{max}$, may be a maximum deceleration that is safe, $a_{max(safe)}$, under the current operating conditions of the vehicle. Alternatively and for personal comfort preferences, the operator of the vehicle 10 may set the maximum acceleration rate, $a_{max}$, to a value that is less than the maximum safe acceleration rate, $a_{max(safe)}$. The maximum safe acceleration rate, $a_{max(safe)}$, may be a function of the current operating conditions including the road conditions (e.g., dry, wet, or other ground surface conditions that may alter the coefficient of friction between the wheels of the vehicle and the road), environmental conditions (e.g., rain, snow, wind, ambient air temperature, humidity, or other external conditions), vehicle conditions (e.g., turning, traveling on a downgrade or upgrade, etc.), etc. The maximum safe acceleration rate, $a_{max(safe)}$, may be a maximum deceleration that correlates with the driver being able to maintain control of the vehicle without the wheels 42 slipping and/or the friction brakes 60 locking. The maximum safe acceleration rate, $a_{max(safe)}$, may be based on the following relationship (2):

$$a_{max(safe)} = f(\text{current operating conditions}) \quad (2)$$

The maximum acceleration rate, $a_{max}$, may be set to a value that maintains the following relationship (3) with the maximum safe acceleration rate, $a_{max(safe)}$:

$$a_{max} \leq a_{max(safe)} \quad (3)$$

If the linear acceleration rate, $a_{linear}$, is greater than or equal to the maximum acceleration rate, $a_{max}$, at decision block 106, the method 100 moves onto block 110 where emergency or maximum braking of the vehicle 10 is commanded, which may include an application of the friction brakes 60 and/or an application of regenerative braking via the M/G 18.

If the linear acceleration rate, $a_{linear}$, is not greater than the maximum acceleration rate, $a_{max}$, at decision block 106, the method 100 moves onto decision block 112 where it is determined if the difference between the current distance, $d_{cur}$, and the minimum required distance, $d_{min}$, between the vehicle 10 and the forward detected object is greater than or equal to a roll out distance, $d_{RL}$, of the vehicle 10. The relationship between the current distance, $d_{cur}$, the minimum required distance, $d_{min}$, and the roll out distance, $d_{RL}$, may be based on the following relationship (4):

$$d_{cur} - d_{min} \leq d_{RL} \quad (4)$$

The roll out distance, $d_{RL}$, of the vehicle 10 is the distance the vehicle will travel if the speed differential between the vehicle 10 and the forward detected object, $V_{veh} - V_{ob}$, is reduced to zero from a current differential value via vehicle coasting. During vehicle coasting the power output of the engine 14 and the M/G 18 are reduced to zero and the vehicle 10 is decelerated by the road loads (e.g., loads resulting from road friction, road gradient, aerodynamic drag, etc.) applied to the vehicle 10. A road load model, represented by block 114, is input into a model for the roll out distance, $d_{RL}$, represented by block 116, which is then input into decision block 112. The rollout distance model 116 may also take wind resistance into consideration. The road load power (which may also be referred to as the power being applied to the vehicle from the road and by aerodynamic drag), $P_{RL}$, may be a function of the velocity, $V_{veh}$, of the vehicle 10, the force being applied to the vehicle, $F_{RL}$, from the road, and aerodynamic drag. The force being applied to the vehicle (or road load force), $F_{RL}$, from the road may be a function of the velocity, $V_{veh}$, of the vehicle 10. The roll out distance, $d_{RL}$, may be a function of the force being applied to the vehicle from the road and aerodynamic drag, $F_{RL}$, and the velocity, $V_{veh}$, of the vehicle 10. The force being applied to the vehicle, $F_{RL}$, the road load, $P_{RL}$, and the roll out distance, $d_{RL}$, may be represented by the following relationships (5) and (6):

$$F_{RL} = f(V_{veh}) \quad (5)$$

$$P_{RL} = F_{RL} \times V_{veh} \quad (6)$$

If the difference between the current distance, and the minimum required distance, $d_{min}$, between the vehicle 10 and the forward detected object is greater than or equal to the roll out distance, $d_{RL}$, the method moves onto block 118 where both regenerative and friction braking is disabled (i.e., the brakes are released) and the vehicle 10 is allowed to be decelerated by the road load (i.e. rolling friction), aerodynamic drag, and/or road gradient alone. to reduce the distance between the vehicle 10 and the forward detected object from the current distance, $d_{cur}$, to the minimum required distance, $d_{min}$. The speed differential between the vehicle 10 and the forward detected object, $V_{veh}$-$V_{ob}$, may also be reduced to zero upon obtaining the minimum required distance, $d_{min}$, between the vehicle 10 and the forward detected object.

If the difference between the current distance, $d_{cur}$, and the minimum required distance, $d_{min}$, between the vehicle 10 and the forward detected object is less than the roll out distance, $d_{RL}$, the method move onto block 120 where the vehicle is decelerated according to a method to maximize regenerative braking while also reducing the distance between the vehicle 10 and the forward detected object from the initial distance, $d_{cur}$, to the minimum required distance, $d_{min}$. Decelerating the vehicle 10 by regenerative braking includes braking the vehicle by operating the M/G 18 as generator. The speed differential between the vehicle 10 and the forward detected object, $V_{veh}$-$V_{ob}$, may also be reduced to zero upon obtaining the minimum required distance, $d_{min}$, between the vehicle 10 and the forward detected object.

In order to maximize the energy recovered via regenerative barking at block 120, two optional methods of regenerative braking may be used. The first method includes braking at a maximum regenerative braking acceleration rate, $a_{regen(max)}$, in order to minimize road load losses. The second method includes braking at the optimum acceleration rate, taking into account reduction of road load losses as well as the efficiency of the electric powertrain system.

The maximum regenerative braking acceleration rate, $a_{regen(max)}$, utilized by the first regenerative braking method, may be based on the following relationships (7) and (8):

$$a_{regen(max)} = \frac{P_{EL\_max} + P_{RL}}{m_{veh} \times V_{veh}} \quad (7)$$

$$P_{EL\_max} = f(\text{battery conditions, motor/generator conditions}) \quad (8)$$

$m_{veh}$ is the mass of the vehicle 10.

$P_{EL\_max}$ is the maximum regenerative braking power that the powertrain of the vehicle 10 is capable of producing. $P_{EL\_max}$ may be a function of specific conditions of the battery 20, M/G 18, and/or other components of the vehicle's powertrain including, but not limited to, the size of the battery 20, temperature of the battery 20, state of charge of the battery 20, generating power output capacity of the M/G 18, etc.

In order to determine if the first regenerative braking method minimizes energy loss, the road load power, $P_{RL}$, may be examined. Road load power, $P_{RL}$, may be based on the following relationship (9):

$$P_{RL} = F_{RL} \times V_{Veh} \quad (9)$$

Road load force, $F_{RL}$, may be approximated by a quadratic equation and represented by the following relationship (1):

$$F_{RL} = f(v) = a + bV_{veh} + cV_{veh}^2 \quad (10)$$

a, b, and c being constant coefficients.

Accordingly, the equation for road load power $P_{RL}$, may be adjusted to the following relationship (11):

$$P_{RL} = F_{RL} \times V_{Veh} = (a + bV_{veh} + cV_{veh}^2) \cdot V_{Veh} = aV_{Veh} + bV_{Veh}^2 + cV_{Veh}^3 \quad (11)$$

The vehicle velocity, $V_{veh}$, will depend on the vehicle acceleration, $a_{veh}$, and vehicle acceleration, $a_{veh}$, will depend on the power of recuperation power. The higher the recuperation power the quicker the vehicle will decelerate. Road loads will also decelerate the vehicle. Vehicle acceleration, $a_{veh}$, and vehicle velocity, $V_{veh}$, may be based on the following relationships (12) and (13):

$$a_{veh} = \frac{dv_{veh}}{dt} \quad (12)$$

$$V_{Veh} = V_{veh\ int} - \int_{T_0}^{T_1} \frac{dv_{veh}}{dt} \cdot dt \quad (13)$$

$V_{veh\ int}$ being the initial speed of the vehicle.

The energy lost due to road load, $E_{RL}$, may then be based on the following relationship:

$$E_{RL} = \int_{T_0}^{T_1} P_{RL} dt \quad (14)$$

When the above set of formulas are applied and the maximum possible recuperation power, $P_{EL\_max}$, will lead to minimized energy lost to road load, $E_{RL}$, then the first regenerative braking method may be applied.

In order to determine if the second regenerative braking method (i.e., braking at the optimum acceleration rate according to method, taking into account reduction of road load losses as well as the efficiency of the electric powertrain system) minimizes energy loss, the system may be examined to find an optimum based on computing the minimum of an energy loss function. Energy loss, $E_L$, of the vehicle system may be represented by the following relationships (15) and (16)

$$E_L = f(P_{Recup}) \quad (15)$$

$$\text{Select } P_{Recup} \text{ so that } E_L = \min \quad (16)$$

$P_{Recup}$ being the regenerative (or recuperation) braking power.

While road load losses alone may be minimized by running the system at the maximum recuperation power, as outlined according the first regenerative braking method above, the electrical powertrain system may run at sub-optimum efficiency under certain circumstances. Hence an another approach (e.g., the second regenerative braking method) may take into account both the road load losses and the losses of the electrical system. During regenerative braking, the loss power $P_L$ of the vehicle system may be a function of road load power, $P_{RL}$, and loss power of the electrical powertrain system, $P_{LE}$, and may be represented by the following relationship (17):

$$P_L = P_{RL} + P_{LE} \quad (17)$$

The loss power, $P_{LE}$, of the electrical powertrain system may be based on recuperation power, $P_{Recup}$, and may be represented by the following relationship (18):

$$P_{LE} = f(P_{Recup}) \quad (18)$$

All elements of the electric powertrain system may contribute to the loss power, $P_{LE}$, of the electrical powertrain system. Components of the electrical powertrain system may include the traction battery 20, the power electronics 56, and the M/G 18. Accordingly, there will be traction battery loss power, $P_{LB}$, power electronics loss power, $P_{LPE}$, and electrical machine (i.e., the M/G 18) loss power, $P_{LEM}$. Accordingly, the equation for loss power, $P_{LE}$, of the electrical powertrain system may be adjusted to the following relationship (19)

$$P_{LE} = P_{LB} + P_{LPE} + P_{LEM} \quad (19)$$

Traction battery loss power, $P_{LB}$, power electronics loss power, $P_{LPE}$, and electrical machine loss power, $P_{LEM}$, will typically depend on the amount of electric power being converted, (i.e. the regenerative braking power) and may be represented by the following relationships (20), (21), and (22):

$$P_{LB} = f(P_{Recup}) \quad (20)$$

$$P_{LPE} = f(P_{Recup}) \quad (21)$$

$$P_{LEM} = f(P_{Recup}) \quad (22)$$

The above functional relationships may be derived by tests. As outlined in the above paragraphs, the loss power, $P_L$, is a function of the recuperation power, and as such it will be possible to calculate a number of loss energy values, $E_{L-1}, E_{L-2}, \ldots, E_{L-n}$, for a number of different regenerative braking power levels, $P_{Recup-1}, P_{Recup-2}, \ldots, P_{Recup-n}$. The may be accomplished by utilizing a variation of equation (14) above with the $E_L$ and $P_{Recup}$ variables replacing the $E_{RL}$ and $P_{RL}$ variables, respectively. $T_0$ is the current time and $T_1$ can be chosen (e.g. 1 s, 2 s, 5 s). Among the recuperation power levels $P_{Recup-1}, P_{Recup-2}, \ldots, P_{Recup-n}$, the system will select the one, which gives the lowest loss energy, as the optimum recuperation power level.

While method 2 will always ensure that recuperation will be performed at the overall optimum efficiency, it is also much more difficult to compute. In many cases, the efficiency of the electric powertrain components and the total electric powertrain system increases towards higher power levels up to the maximum power. In these cases, method 1 will produce the overall optimum recuperation profile.

By iteratively applying method 100, changing conditions (e.g., the forward detected object no longer being in the path of the vehicle 10, the speed differential between the vehicle 10 and the forward detected object indicates the forward detected object is moving further away from the vehicle 10, etc.) are taken into account.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

Figure 3:
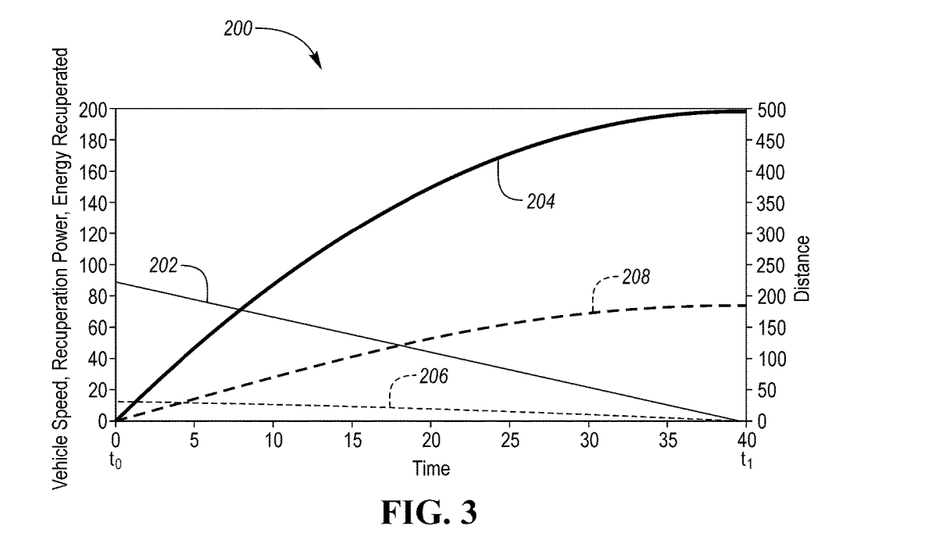
FIG. 3 is an exemplary graph illustrating the energy that may be recuperated via regenerative braking if the vehicle is braked at a constant deceleration rate, during a condition where the initial recuperation power is not exceeding the maximum recuperation power capability of the electric powertrain, to both reduce the distance to the forward detected object to the minimum distance and reduce a speed differential between the vehicle and the forward detected object to zero.
Figure 4:
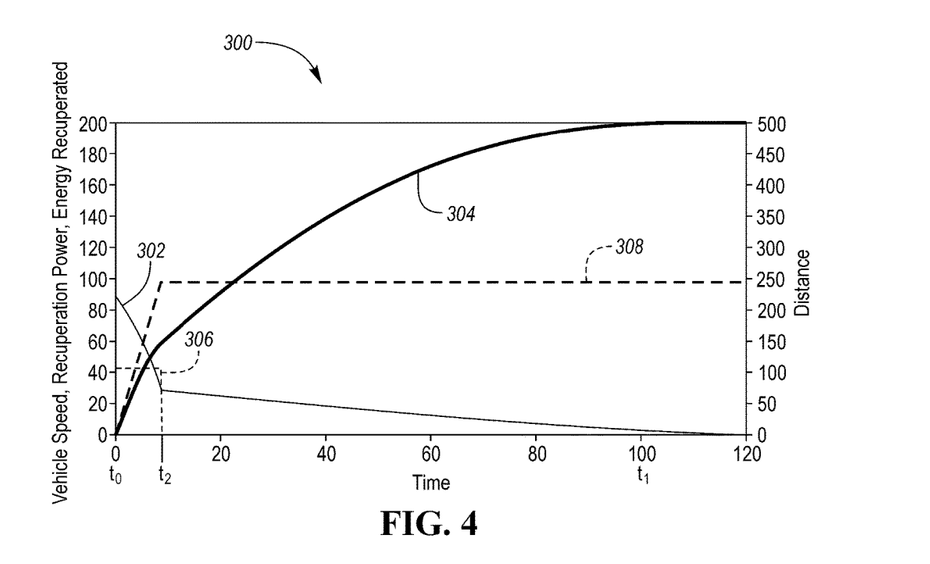
FIG. 4 is an exemplary graph illustrating the energy that may be recuperated, during the condition where the initial recuperation power is not exceeding the maximum recuperation power capability of the electric powertrain, by braking the vehicle at a first rate via regenerative braking alone followed by braking the vehicle at a second rate to both reduce the distance to the forward detected object to the minimum distance and reduce the speed differential between the vehicle and the forward detected object to zero.

Referring to FIGS. 3 and 4, exemplary graphs depicting the amount of kinetic energy recovered via regenerative braking by decelerating the vehicle to reduce the speed differential between the vehicle 10 and the forward detected object, $V_{veh} - V_{ob}$, to zero while at the same time decreasing the distance of the vehicle 10 to the forward detected object from an initial distance to the minimum required distance, $d_{min}$, are illustrated. The regenerative braking events depicted in FIGS. 3 and 4 each occur during under a "low kinetic energy" condition. During "low kinetic energy conditions" the ratio of the distance to the forward detected object vs. vehicle velocity, $V_{veh}$, is such that the system will not exceed the electric powertrain regenerative recuperation power limits, if the vehicle decelerates according to the linear deceleration profile. At time $t_0$ in both graphs the vehicle is located at the initial distance from the forward detected object and the speed differential between the vehicle 10 and the forward detected object, $V_{veh} - V_{ob}$ has a starting or initial value. At time $t_1$ in both graphs the speed differential between the vehicle 10 and the forward detected object, $V_{veh} - V_{ob}$, is reduced to zero upon obtaining the minimum required distance, $d_{min}$.

The graph 200 in FIG. 3 illustrates the amount of kinetic energy recovered via regenerative braking by decelerating the vehicle 10 at the linear acceleration rate (or baseline deceleration rate), $a_{linear}$, between times $t_0$ and $t_1$. The speed differential between the vehicle 10 and the forward detected object, $V_{veh} - V_{ob}$, is depicted by line 202, the reduction in the relative distance between the vehicle 10 and the forward detected object in depicted by line 204, the regenerative braking power (or recuperation power) is depicted by line 206, and the total energy recuperated by regenerative braking is depicted by line 208. The linear acceleration rate, $a_{linear}$, is equal to the slope of speed differential between the vehicle 10 and the forward detected object 202. Regenerative braking alone (i.e., the M/G 18 applies a braking force while friction brakes 60 do not) may be used to decelerate the vehicle 10. However, since deceleration is occurring at a constant rate by regenerative braking alone, regenerative braking is below the maximum regenerative braking acceleration rate, $a_{regen(max)}$, and steadily decreases to zero at time $t_1$. At time $t_1$, the total amount of energy that may be recovered under the low deceleration condition via regenerative braking by decelerating the vehicle at the constant rate (i.e., the linear acceleration rate, $a_{linear}$) to reduce the speed differential between the vehicle 10 and the forward detected object, $V_{veh} - V_{ob}$, to zero upon obtaining the minimum required distance, $d_{min}$, is illustrated.

The graph 300 in FIG. 4 illustrates the amount of kinetic energy recovered via regenerative braking by decelerating the vehicle 10 according to the method 100 between times $t_0$ and $t_1$, under the "low kinetic energy" condition. The speed differential between the vehicle 10 and the forward detected object, $V_{veh} - V_{ob}$, is depicted by line 302, the reduction in the relative distance between the vehicle 10 and the forward detected object is depicted by line 304, the regenerative braking power (or recuperation power) is depicted by line 306, and the total energy recuperated by regenerative braking is depicted by line 308. During a first time period, between times $t_0$ and $t_2$, the vehicle is decelerated by regenerative braking alone at a first deceleration rate. This can be either the maximum regenerative braking acceleration rate, $a_{regen(max)}$ according to the first method or at the optimum regenerative braking acceleration rate, $a_{regen(opt)}$ according to the second method, each described above. Under the "low kinetic energy" condition, this initial braking rate is typically lower than the linear braking rate. At $t_2$, condition 112 is met, where the difference between the current distance, $d_{cur}$, and the minimum required distance, $d_{min}$, is greater than or equal to the roll out distance, $d_{RL}$, of the vehicle 10 at the current vehicle speed. Then, during a second time period, between times $t_2$ and $t_1$, after the first time period, between times $t_0$ and $t_2$, the vehicle 10 is decelerated by coasting alone (i.e. deceleration by road load, road gradient, aerodynamic drag, etc), which results in decelerating the vehicle 10 at a second deceleration rate that is less than the linear acceleration rate, $a_{linear}$. The deceleration rate of the vehicle 10 is equal to the slope of speed differential between the vehicle 10 and the forward detected object 302 during any time period depicted on the graph 300. Since road, wind or other conditions can change, while the vehicle is coasting, there may be one of more short periods of recuperation braking and/or slight acceleration, to take into account these changes. The increase in recovered energy results from a reduction in energy losses to road loads.

Figure 5:
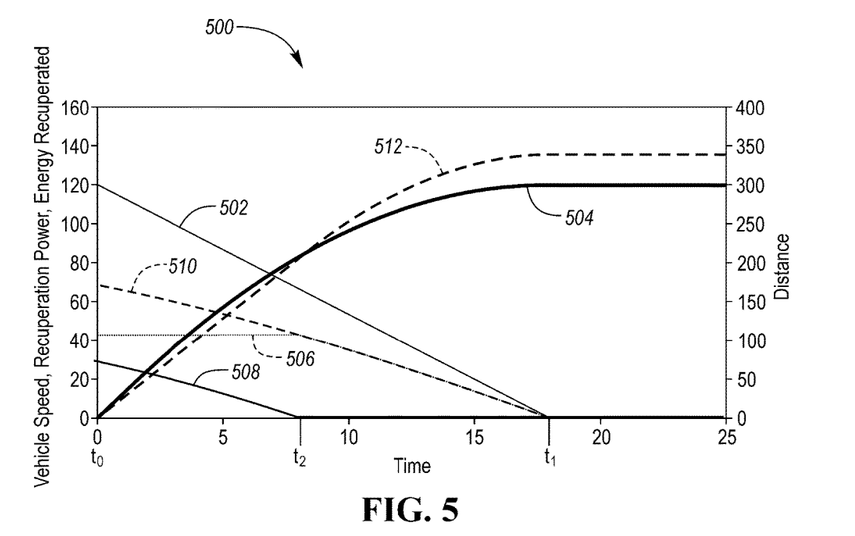
FIG. 5 is an exemplary graph illustrating the energy that may be recuperated via regenerative braking if the vehicle is braked at a constant deceleration rate, during a condition where the initial recuperation power is exceeding the maximum recuperation power capability of the electric powertrain, to both reduce the distance to the forward detected object to the minimum distance and reduce the speed differential between the vehicle and the forward detected object to zero.
Figure 6:
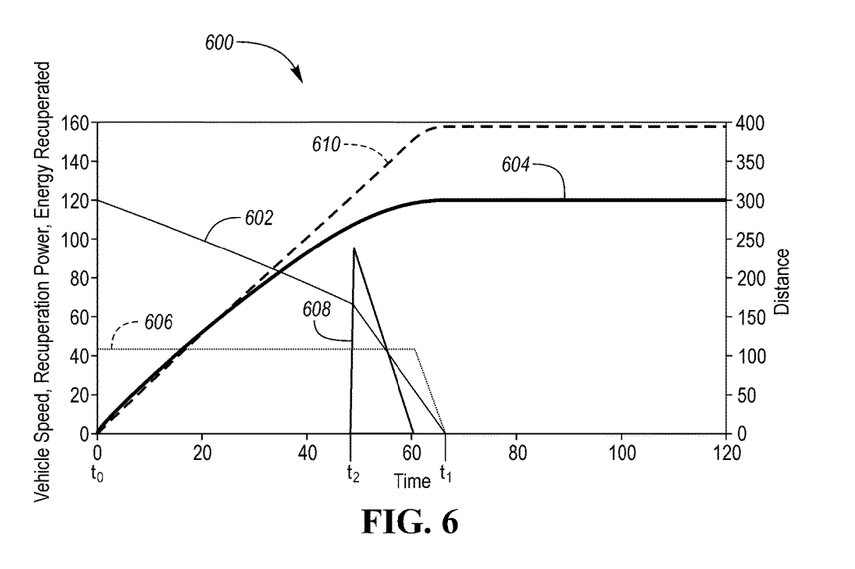
FIG. 6 is an exemplary graph illustrating the energy that may be recuperated, during the condition where the initial recuperation power is exceeding the maximum recuperation power capability of the electric powertrain, by braking the vehicle at a first rate via regenerative braking alone followed by braking the vehicle at a second rate to both reduce the distance to the forward detected object to the minimum distance and reduce the speed differential between the vehicle and the forward detected object to zero.

Referring to FIGS. 5 and 6, exemplary graphs depicting the amount of kinetic energy recovered via regenerative braking by decelerating the vehicle to reduce the speed differential between the vehicle 10 and the forward detected object, $V_{veh} - V_{ob}$, to zero while at the same time decreasing the distance of the vehicle 10 to the forward detected object from an initial distance to the minimum required distance, $d_{min}$, are illustrated. The regenerative braking events depicted in FIGS. 5 and 6 each occur under a "high kinetic energy" condition. During "high kinetic energy conditions" the ratio of distance to object to the forward detected object vs vehicle velocity, $V_{veh}$, is such that the system will initially exceed the electric powertrain recuperation power limits, if the vehicle decelerates according to the linear deceleration profile. At time $t_0$ in both graphs the vehicle is located at the initial distance from the forward detected object and the speed differential between the vehicle 10 and the forward detected object, $V_{veh}-V_{ob}$ has a starting or initial value. At time $t_1$ in both graphs the speed differential between the vehicle 10 and the forward detected object, $V_{veh}-V_{ob}$, is reduced to zero upon obtaining the minimum required distance, $d_{min}$.

The graph 500 in FIG. 5 illustrates the amount of kinetic energy recovered via regenerative braking by decelerating the vehicle 10 at the linear acceleration rate (or baseline deceleration rate), $a_{linear}$, between times $t_0$ and $t_1$. The speed differential between the vehicle 10 and the forward detected object, $V_{veh}-V_{ob}$, is depicted by line 502, the reduction in the relative distance between the vehicle 10 and the forward detected object is depicted by line 504, the regenerative braking power (or recuperation power) is depicted by line 506, the friction braking power is depicted by line 508, the total braking power (regenerative braking plus friction braking) is depicted by line 510, and the total energy recuperated by regenerative braking is depicted by line 512. The linear acceleration rate, $a_{linear}$, is equal to the slope of speed differential between the vehicle 10 and the forward detected object 502. In order to maintain the linear acceleration rate, $a_{linear}$, friction braking is used during the a first time period, between times $t_0$ and $t_2$, to decelerate the vehicle 10 because the total braking power required during the first time period (in order to maintain a linear deceleration rate) exceeds the maximum regenerative braking acceleration rate, $a_{regen(max)}$. During a second time period, between times $t_2$ and $t_1$ and following the first time period, the vehicle 10 is decelerated by regenerative braking alone (i.e., the regenerative braking power 506 is equal to the total braking power 510 between times $t_2$ and $t_1$) because the total braking power required during the second time period does not exceed the maximum regenerative braking acceleration rate, $a_{regen(max)}$, or at a rate that is was set by the vehicle operator or is limited by safety conditions. During the second time period, however, the amount of regenerative braking decreases continuously, from the maximum rate to zero, in order to maintain the linear acceleration rate, $a_{linear}$. At time $t_1$, the total amount of energy that may be recovered under the high deceleration condition via regenerative braking by decelerating the vehicle at the constant rate (i.e., the linear acceleration rate, $a_{linear}$) to reduce the speed differential between the vehicle 10 and the forward detected object, $V_{veh}-V_{ob}$, to zero upon obtaining the minimum required distance, $d_{min}$, is illustrated.

The graph 600 in FIG. 6 illustrates the amount of kinetic energy recovered via regenerative braking by decelerating the vehicle 10 according to the method 100 between times $t_0$ and $t_1$ under the "high kinetic energy" condition. The speed differential between the vehicle 10 and the forward detected object, $V_{veh}-V_{ob}$, is depicted by line 602, the reduction in the relative distance between the vehicle 10 and the forward detected object is depicted by line 604, the regenerative braking power (or recuperation power) is depicted by line 606, the friction braking power is depicted by line 608, and the total energy recuperated by regenerative braking is depicted by line 610. During a first time period, between times $t_0$ and $t_2$, the vehicle is decelerated by regenerative braking alone at a first deceleration rate that is less than the linear acceleration rate, $a_{linear}$. This can be either the maximum regenerative braking acceleration rate, $a_{regen(max)}$ according to first method or at the optimum regenerative braking acceleration rate, $a_{regen(opt)}$ according to the second method, such that the powertrain may produce the maximum regenerative braking power $P_{EL\_max}$, between times $t_0$ and $t_2$. Under the "high kinetic energy" condition, this initial braking rate is typically lower than the linear braking rate. Alternatively, the vehicle 10 may be decelerated at a rate that was set by the vehicle operator or is limited by safety conditions, as described above. After the time period between times $t_0$ and $t_2$, the vehicle 10 is decelerated during a second time period, between times $t_2$ and $t_1$, by a combination of regenerative braking and friction braking which results in decelerating the vehicle 10 at a second deceleration rate that is greater than the linear acceleration rate, $a_{linear}$. Friction braking is used during a first portion of the second time period, between times $t_2$ and $t_1$, while regenerative braking is used during the entire second time period, between times $t_0$ and $t_2$. The maximum regenerative braking acceleration rate, $a_{regen(max)}$, or a rate that was set by the vehicle operator or is limited by safety conditions, may be maintained during a majority of the second time period, between times $t_2$ and $t_1$. Regenerative braking eventually, however, decreases along a linear path to zero at $t_1$ in order to maintain decelerating the vehicle 10 at the second deceleration rate that is greater than the linear acceleration rate, $a_{linear}$. The deceleration rate of the vehicle 10 is equal to the slope of speed differential between the vehicle 10 and the forward detected object 602 during any time period depicted on the graph 600. Additional energy is recovered by avoiding friction braking in the early phase of the braking maneuver, when compared to decelerating the vehicle at the linear acceleration rate (or baseline deceleration rate), $a_{linear}$. The increase in recovered energy results from a reduction in energy lost to friction braking when the vehicle is 10 decelerated according to the method 100 when compared to the linear acceleration rate, $a_{linear}$, between times $t_0$ and $t_1$.

It should be understood that the vehicle configuration described herein is merely exemplary and is not intended to be limited. Other hybrid or electric vehicle configurations should be construed as disclosed herein. Other vehicle configurations may include, but are not limited to, series hybrid vehicles, parallel hybrid vehicles, series-parallel hybrid vehicles, power-split hybrid vehicles, plug-in hybrid electric vehicles (PHEVs), fuel cell hybrid vehicles, battery operated electric vehicles (BEVs), or any other vehicle configuration known to a person of ordinary skill in the art.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle system comprising:
   a controller programmed to,
   responsive to a speed differential between the vehicle and a forward detected object, decelerate the vehicle at a first rate during a first period via regenerative braking alone and decelerate the vehicle at a second rate during a second period, following the first period, to reduce a distance to the forward detected object from an initial distance to a minimum distance, and
   responsive to a high energy condition where a ratio of the distance to the forward detected object and a vehicle speed is such that regenerative braking would exceed a regenerative braking limit by decelerating the vehicle according to a baseline rate, set the first rate to a value that is less than the second rate.

2. The vehicle system of claim 1, wherein controller is programmed to set the first rate to a value that is greater than the second rate under a low energy condition where a ratio of the distance to the forward detected object and a vehicle speed is such that regenerative braking would not exceed a regenerative braking limit by decelerating the vehicle according to a baseline rate.

3. The vehicle system of claim 2, wherein the first rate is greater than the baseline rate and the second rate is less than the baseline rate, the baseline rate being a constant deceleration rate that will reduce the speed differential from a current value to zero and reduce the distance to the forward detected object from the initial distance to the minimum distance.

4. The vehicle system of claim 2, wherein the controller is programmed to decelerate the vehicle at the second rate during the second period via vehicle coasting.

5. The vehicle system of claim 1, wherein the first rate is less than the baseline rate and the Currently Amended rate is greater than the baseline rate, the baseline rate being a constant deceleration rate that will reduce the speed differential from a current value to zero and reduce the distance to the forward detected object from the initial distance to the minimum distance.

6. The vehicle system of claim 1, wherein the controller is programmed to decelerate the vehicle at the second rate during the second period via friction braking.

7. The vehicle system of claim 1, wherein the controller is programmed to decelerate the vehicle at the second rate during the second period via a combination of regenerative braking and friction braking.

8. The vehicle system of claim 1 further comprising an electric machine configured to recharge a battery during regenerative braking, wherein decelerating the vehicle at the first rate maximizes regenerative braking power of the electric machine.

9. The vehicle system of claim 1, wherein the controller is programmed to reduce the speed differential to zero upon obtaining the minimum distance.

10. A regenerative braking method comprising:
    responsive to a speed differential between a vehicle and a forward detected object, decelerating the vehicle at a first rate during a first period via regenerative braking alone and decelerating the vehicle at a second rate during a second period, following the first period, to reduce a distance to the forward detected object from an initial distance to a minimum distance, and
    responsive to a high energy condition where a ratio of the distance to the forward detected object and a vehicle speed is such that regenerative braking would exceed a regenerative braking limit by decelerating the vehicle according to a baseline rate, set the first rate to a value that is less than the second rate.

11. The method of claim 10 further comprising setting the first rate to a value that is greater than the second rate under a low energy condition where a ratio of the distance to the forward detected object and a vehicle speed is such that regenerative braking would not exceed a regenerative braking limit by decelerating the vehicle according to a baseline rate.

12. The method of claim 11, wherein the first rate is greater than the baseline rate and the second rate is less than the baseline rate, the baseline rate being a constant deceleration rate that will reduce the speed differential from a current value to zero and reduce the distance to the forward detected object from the initial distance to the minimum distance.

13. The method of claim 11, wherein the vehicle is decelerated at the second rate during the second period via vehicle coasting.

14. The method of claim 10, wherein the first rate is less than the baseline rate and the second rate is greater than the baseline rate, the baseline rate being a constant deceleration rate that will reduce the speed differential from a current value to zero and reduce the distance to the forward detected object from the initial distance to the minimum distance.

15. The method of claim 10, wherein the vehicle is decelerated at the second rate during the second period via friction braking.

16. The method of claim 10, wherein the vehicle is decelerated at the second rate during the second period via a combination of regenerative braking and friction braking.

17. The method of claim 10, wherein the speed differential is reduced to zero upon obtaining the minimum distance.

18. A vehicle comprising:
    a generator; and
    a controller programmed to, responsive to a distance to a forward object and a vehicle speed being such that regenerative braking at a linear baseline rate to maintain a minimum distance between the object and vehicle would exceed a regenerative braking limit, decelerate the vehicle at a first rate via the generator, and subsequently decelerate the vehicle at a second rate that is greater than the first rate.

19. The vehicle of claim 18 further comprising friction brakes, and wherein the vehicle is decelerated at the second rate via a combination of regenerative braking and friction braking.

20. The vehicle of claim 18, wherein the first rate is less than the baseline linear rate and the second rate is greater than the baseline linear rate, the baseline linear rate being a constant deceleration rate that will reduce a speed differential between the vehicle and the forward object from a current value to zero and reduce the distance to the forward detected object from an initial distance to the minimum distance.

* * * * *